(12) United States Patent
Aerts et al.

(10) Patent No.: US 11,204,475 B2
(45) Date of Patent: Dec. 21, 2021

(54) OPTICAL FIBER LOOP RELAXATION

(71) Applicant: COMMSCOPE CONNECTIVITY BELGIUM BVBA, Kessel-Lo (BE)

(72) Inventors: Maarten Aerts, Kessel-Lo (BE); Eric Schurmans, Hogen-Geetbets (BE); Conny Van De Velde, Herselt (BE); Chris Knaepen, Betekom (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/962,767

(22) PCT Filed: Jan. 14, 2019

(86) PCT No.: PCT/EP2019/050840
§ 371 (c)(1),
(2) Date: Jul. 16, 2020

(87) PCT Pub. No.: WO2019/141636
PCT Pub. Date: Jul. 25, 2019

(65) Prior Publication Data
US 2020/0355883 A1 Nov. 12, 2020

Related U.S. Application Data

(60) Provisional application No. 62/619,481, filed on Jan. 19, 2018.

(51) Int. Cl.
*G02B 6/44* (2006.01)
(52) U.S. Cl.
CPC ......... *G02B 6/4455* (2013.01); *G02B 6/4441* (2013.01); *G02B 6/4457* (2013.01)

(58) Field of Classification Search
CPC .................................................. G02B 6/4457
See application file for complete search history.

(56) References Cited

U.S. PATENT DOCUMENTS 6,076,755 A * 6/2000 Talamini, Sr. ......... B65H 49/08
242/129
6,315,598 B1 * 11/2001 Elliot .................... G02B 6/4466
439/456
(Continued)

FOREIGN PATENT DOCUMENTS

| EP | 2 680 055 A1 | 1/2014 | |
| FR | 2917183 A1 * | 12/2008 | ........... G02B 6/4441 |
| WO | 2012/113643 A1 | 8/2012 | |

OTHER PUBLICATIONS

International Search Report and Written Opinion of the International Searching Authority for International Patent Application No. PCT/EP2019/050840 dated Apr. 18, 2019, 13 pages.

Primary Examiner — Charlie Y Peng
(74) Attorney, Agent, or Firm — Merchant & Gould P.C.

(57) ABSTRACT

Apparatuses and methods for optical fiber loop relaxation are provided for telecommunications management apparatuses, such as fiber optic telecommunications trays. The apparatus includes a radius limiter block for routing fibers therearound, and a fiber loop management recess provided on a peripheral surface of the radius limiter block. The fiber loop management recess is configured to receive a fiber loop management device between the radius limiter block and the fibers routed around the radius limiter block.

20 Claims, 6 Drawing Sheets

(56) References Cited

U.S. PATENT DOCUMENTS

| | | | | |
|---|---|---|---|---|
| 8,929,708 B2* | 1/2015 | Pimentel | ............. | G02B 6/4477 |
| | | | | 385/135 |
| 9,588,317 B2* | 3/2017 | Bryon | ................. | G02B 6/4469 |
| 2010/0061693 A1* | 3/2010 | Bran de Leon | ...... | G02B 6/4454 |
| | | | | 385/135 |
| 2013/0243386 A1 | 9/2013 | Pimentel et al. | | |
| 2014/0193129 A1* | 7/2014 | Bryon | ................. | G02B 6/4469 |
| | | | | 385/135 |
| 2014/0321825 A1 | 10/2014 | Claessens et al. | | |

\* cited by examiner

OPTICAL FIBER LOOP RELAXATION

CROSS-REFERENCE TO RELATED APPLICATION

This application is a National Stage Application of PCT/EP2019/050840, filed on Jan. 14, 2019, which claims the benefit of U.S. Patent Application Ser. No. 62/619,481, filed on Jan. 19, 2018, the disclosures of which are incorporated herein by reference in their entireties. To the extent appropriate, a claim of priority is made to each of the above disclosed applications.

BACKGROUND

Optical fiber distribution systems may include equipment such as fiber management trays that are mounted in telecommunications closures or at other locations. Fiber management trays are commonly used to manage, store and protect optical fibers and optical splices. Fiber management trays include fiber routing paths for allowing excess length of optical fibers to be stored in looped configurations without violating minimum bend radius requirements for the optical fibers. When the excess length of optical fibers is wound in looped configurations, it is desirable to avoid tightening the optical fibers in the loops.

SUMMARY

In general terms, the present disclosure is directed to optical fiber loop relaxation. In one possible configuration and by non-limiting example, systems and methods are provided to relax optical fiber loops in a telecommunications management apparatus, such as a fiber optic telecommunications tray. Various aspects are described in this disclosure, which include, but are not limited to, the following aspects.

One aspect is a telecommunications management apparatus including a base plate, a radius limiter block, a fiber loop passage, and a fiber loop management recess. The radius limiter block is configured to route fibers therearound and store fibers with minimum bend radius of the fibers ensured. The radius limiter block projects from the base plate and having a peripheral surface that extends from the base plate and provides a surface around which the fibers are routed. The fiber loop passage is provided around the radius limiter block and configured to receive the fibers routed around the radius limiter block. The fiber loop management recess is provided on the peripheral surface and configured to at least partially receive a fiber loop management device between the radius limiter block and the fibers routed around the radius limiter block.

In certain examples, the apparatus may further include a guide groove provided on the base plate and configured to guide the fiber loop management device radially from the radius limiter block. In certain examples, the guide groove may be arranged to extend radially from the fiber loop management recess of the radius limiter block. In certain examples, the guide groove may be arranged in the fiber loop passage.

In certain examples, the fiber loop management recess extends from a top of the radius limiter block to the base plate. In certain examples, the fiber loop management recess may have a consistent width along a length thereof. In certain examples, the fiber loop management recess may have a width tapered along a length thereof. The width of the fiber loop management recess may become narrower from the top of the radius limiter block toward the base plate.

In certain examples, the apparatus may further include a second radius limiter block arranged adjacent to the radius limiter block. The fiber loop passage may include a figure-8 shaped fiber loop passage around the radius limiter block and the second radius limiter block.

In certain examples, the apparatus may further include a second fiber loop management recess provided on a second peripheral surface of the second radius limiter block and configured to at least partially receive the fiber loop management device between the second radius limiter block and the fibers routed at least partially around the second radius limiter block.

In certain examples, the fiber loop management recess of the radius limiter block is arranged to be opposite to the second fiber loop management recess of the second radius limiter block.

In certain examples, the apparatus may further include a second guide groove provided on the base plate and configured to guide the fiber loop management device radially from the second radius limiter block. In certain examples, the second guide groove is arranged to extend radially from the second fiber loop management recess of the second radius limiter block and extend opposite to the guide groove associated with the radius limiter block.

Another aspect is a method for managing fibers in a telecommunications management apparatus. The method may include: routing a fiber around a radius limiter block on the apparatus; engaging a fiber loop management device with a fiber loop management recess provided on a peripheral surface of the radius limiter block, thereby arranging the fiber loop management device between the radius limiter block and the fiber routed around the radius limiter block; and moving the fiber loop management device radially away from the radius limiter block to space the fiber apart from the peripheral surface of the radius limiter block.

In certain examples, the step of moving the fiber loop management device may include: engaging a distal tip of the fiber loop management device with a guide groove provided on a bottom of the base plate of the apparatus, the guide groove extending radially from the radius limiter block; and moving the fiber loop management device along the guide groove radially away from the radius limiter block.

DETAILED DESCRIPTION

Figure 1:
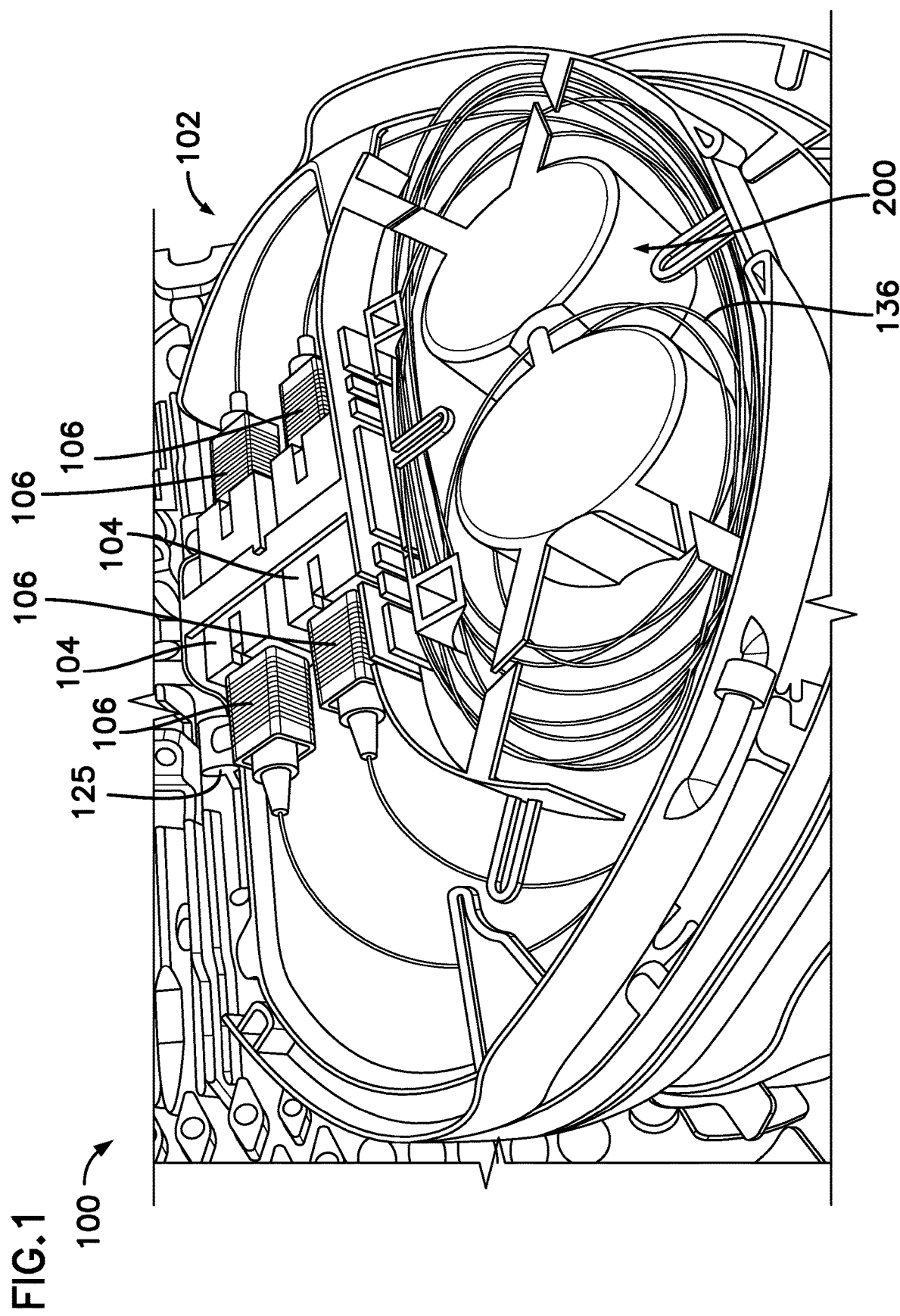
FIG. 1 is a perspective view of a telecommunications management apparatus in accordance with an exemplary embodiment of the present disclosure.

Various embodiments will be described in detail with reference to the drawings, wherein like reference numerals represent like parts and assemblies throughout the several views.

Figure 2:
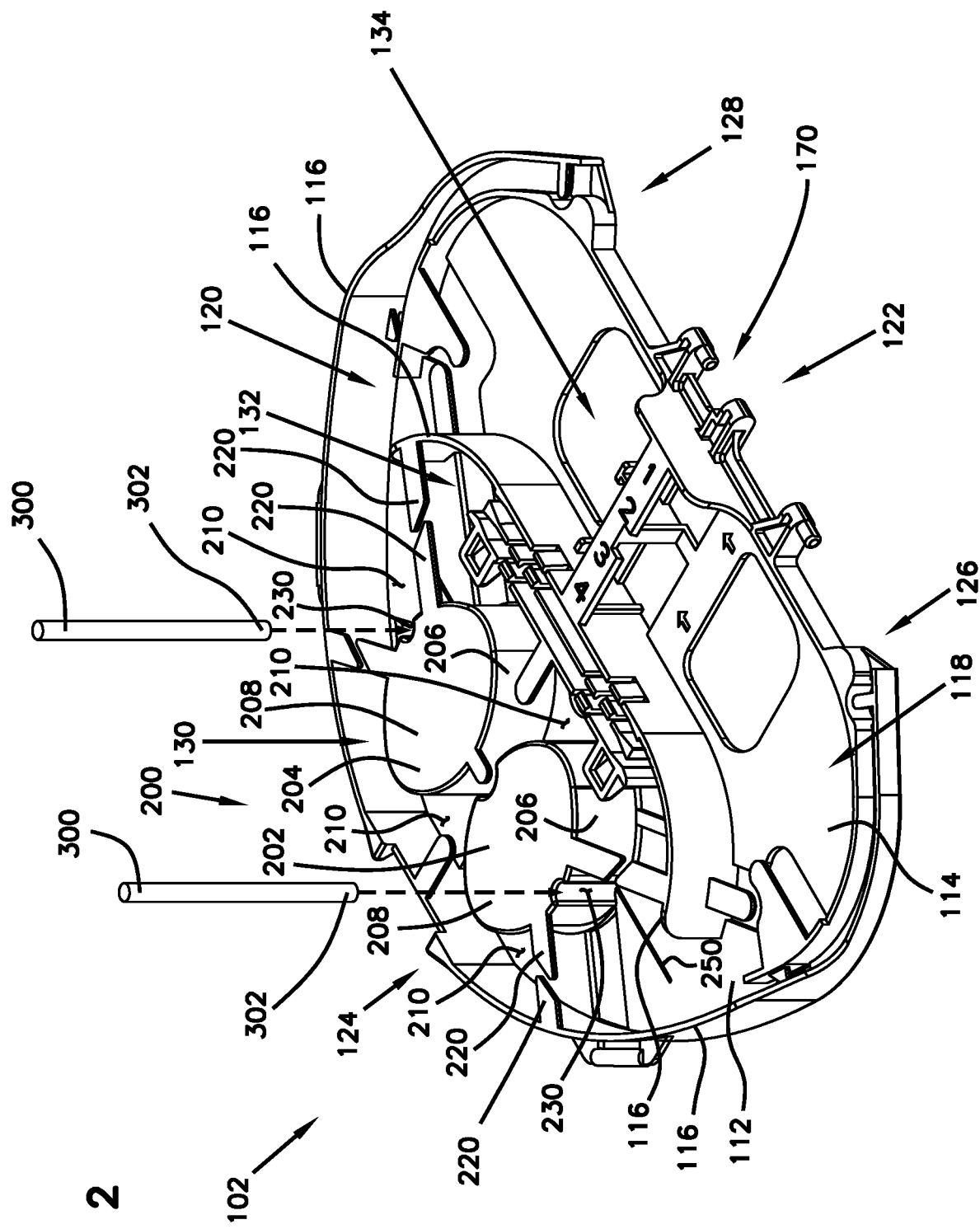
FIG. 2 is a perspective view of the telecommunications management apparatus of FIG. 1 without fibers with connectors and adapters.
Figure 3:
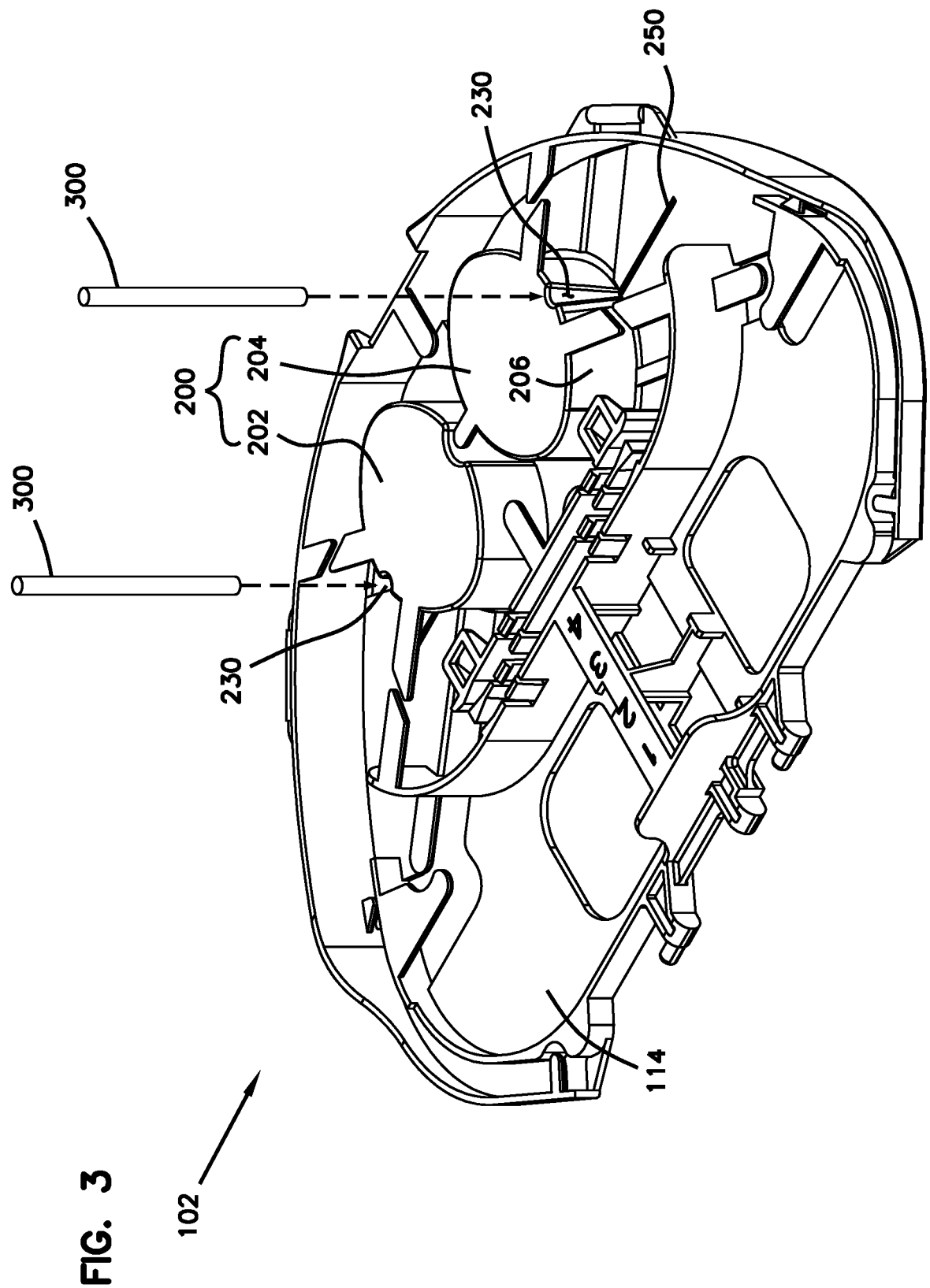
FIG. 3 is another perspective view of the telecommunications management apparatus of FIG. 2.

Referring to FIGS. 1-3, a telecommunications management apparatus is described in accordance with an exemplary embodiment of the present disclosure. In this example, a fiber optic telecommunications tray assembly is illustrated and described primarily as the telecommunications management apparatus, and, therefore, reference number 100 is used to designate both the telecommunications management apparatus and the fiber optic telecommunications tray assembly. It is understood that other types of telecommunications management apparatuses can be used to employ various embodiments of the present disclosure. As illustrated, the fiber optic telecommunications tray assembly 100 includes a fiber optic telecommunications tray 102, a fiber optic adapter 104, and one or more fiber optic connectors 106.

The fiber optic telecommunications tray 102 is configured to receive, store, and manage optical fibers or fiber optical cables therein. It is understood that the tray 102 can be used for optical fibers or fiber optic cables in similar manners. Therefore, the terms, "fiber(s)" and "cable(s)", are interchangeably used to describe various features of the tray in this document. The tray 102 can be of various types, such as a splice tray, splitter tray, a combination thereof, and a housing device having other functions. The tray 102 includes a main body 112 that has a base plate 114 and a cable containment wall 116. In the illustrated example, the cable containment wall 116 extends upwardly from a front side (or a top surface) 118 of the base plate 114 and defines at least a portion of a periphery of the main body 112 of the tray 102 that surrounds the base plate 114.

The base plate 114 of the main body 112 is shown as including a generally flat body of a suitably rigid or resilient plastic or polymeric material, although alternatives are possible. According to some examples, the tray 102 may be formed of a polymeric material, such as, polypropylene, polyethylene, nylon, ABS, PMMA, some other material or any combination thereof. In other examples, the tray 102 may be formed of any suitable rigid or semi-rigid material.

In some examples, the tray 102 has a proximate side 122 and a distal side 124 opposite to the proximate side 122. As described herein, the tray 102 can be mounted to a structure 125 (FIG. 1) at the proximate side 122, such as a tray mounting plate, a fiber optic terminal, a fiber optic splice terminal, or other type of housing/enclosure. For example, the tray 102 is pivotally mounted to such a structure 125 at the proximate side 122 so that the distal side 124 can be rotated relative to the structure. The tray 102 is configured to have a thin plate profile, and thus a plurality of trays 102 is stackable in a limited space.

The tray 102 includes a tray mounting interface 170 for mounting the tray to the structure 125. In the illustrated example, the tray mounting interface 170 is provided at the proximate side 122. The tray mounting interface 170 can include hinge members to pivotally connect the tray 102 to the structure 125. The tray mounting interface 170 allows the tray 102 to rotate or pivot upwardly or downwardly at an angle with respect to a plane of the structure. In other examples, the tray mounting interface 170 can include other mechanical coupling structures, such as pivot mounts, interference fitting, clamps, latches, straps, capture arms, or any other suitable mechanism. An example system suitable for use with trays 102 and showing hinged trays in a stacked arrangement can be found in US Patent Application Publication No. 2014/0321825, the entirety of which is hereby incorporated by reference.

Further, the tray 102 has a first cable entrance side 126 and a second cable entrance side 128. The first and second cable entrance sides 126 and 128 are provided with various features, as described herein, which are configured to receive and guide cables or fibers entering or exiting the tray 102. The first cable entrance side 126 can be arranged to be opposite to the second cable entrance side 128. The first and second cable entrance sides 126 and 128 can be arranged in various configurations in other embodiments. In the illustrated example, the first and second cable entrance sides 126 and 128 are arranged at the proximate side 122 of the tray 102. In other examples, the first and second cable entrance sides 126 and 128 are arranged closer to the proximate side 122 than to the distal side 124 of the tray 102. In yet other examples, the first and second cable entrance sides 126 and 128 can be arranged in different configurations with respect to the proximate side 122 and the distal side 124 of the tray 102.

As described herein, the cable containment wall 116 can function as fiber guides and have curvatures suitable with minimum bend radius requirements of fibers managed on the tray 102.

The cable containment wall 116 defines a cable management space 120 on the base plate 114. As described herein, the cable management space 120 are configured to route fibers, connect (e.g., splice) fibers, store slack or loops of fibers, and organize fibers as necessary. Various structures can be provided in the cable management space 120 including splices and/or storage of cables, which will be described below. Various additional structures can be provided for managing and organizing the fiber optic cables, including a divider wall and cable/fiber retention tabs.

In some examples, the tray 102 can include a fiber storage device 130, a fiber splice device 132, and a fiber termination device 134 in the cable management space 120.

The fiber storage device 130 is provided to route fibers, store slack or loops of fibers, and organize fibers. The fiber storage device 130 is arranged in, or defines, a fiber storage area of the tray. In some examples, the fiber storage device 130 includes one or more radius limiter blocks 200, such as a first radius limiter block 202 and a second radius limiter block 204. The radius limiter blocks 200 are configured to route fibers 136 therearound and store the fibers 136 to ensure a minimum bend radius of the fibers 136 stored on the tray 102. The radius limiter blocks 200 are positioned on the top surface 118 of the base plate 114 in the cable management space 120 and configured to store the fibers 136.

The radius limiter blocks 200 project upwardly from the top surface 118 of the base plate 114 and cooperate to define a fiber loop passage 210 around the radius limiter blocks 200 at the top surface 118 of the base plate 114. The radius limiter blocks 200 are constructed to limit the bend radius of fibers when the fibers are routed or wrapped about the radius limiter blocks 200 for storage and/or organizational purposes.

The radius limiter blocks 200 can also assist and retain fibers in looped configurations. Each of the radius limiter blocks 200 has a peripheral surface 206 that extends between a top 208 of the radius limiter block 200 and the bottom (i.e., the top surface 118) of the base plate 114.

The fiber loop passage 210 is provided around the radius limiter blocks 200 and configured to receive fibers 136 around the radius limiter blocks 200. In the illustrated example, the fiber loop passage 210 includes spaces between the cable containment wall 116 and the radius limiter blocks 200. Further, the fiber loop passage 210 include spaces between the radius limiter blocks 200, which allow for additional cable routing pathways.

In the illustrated example, the first radius limiter block 202 and the second radius limiter block 204 are arranged adjacent to each other (e.g., side-by-side), such that the fiber loop passage 210 includes a figure-8 shaped fiber loop passage around the first radius limiter block 202 and the second radius limiter block 204.

To retain the optical fibers 136 within the fiber loop passage 210, a plurality of fiber retention tabs 220 (also referred to as fingers) are arranged over the fiber loop passage 210. The fiber retention tabs 220 can extend from the fiber containment wall 116 and the radius limiter blocks 200 and elevated from the base plate 114. The fiber retention tabs 220 can be arranged to be substantially parallel with the base plate 114. In some examples, the fiber retention tabs 220 are paired to extend towards each other and leave a gap or space therebetween so that cables can be inserted or removed from the fiber loop passage 210.

Referring still to FIGS. 1-3, the fiber splice device 132 is configured to hold spliced fibers (e.g., by receiving spliced portions of the fibers). The fiber splice device 132 is arranged in, or defines, a fiber splice area of the tray. The fiber splice device 132 can provide an area in which fibers are spliced. In some examples, the fiber splice device 132 includes a plurality of splice slots 142 configured to receive spliced fibers therein. The fibers can be fusion-spliced and arranged in the splice slots 142. Other splice methods can also be used.

The fiber termination device 134 is provided to terminate fibers with connectors. The fiber termination device 134 is arranged in, or defines, a fiber termination area of the tray. For example, as illustrated in FIG. 1, the fibers 136 can be terminated with the connectors 106. The fiber termination device 134 is configured to support one or more adapters 104 for receiving connectorized ends (i.e., the connectors 106) of the fibers 136. The adapters 104 are configured to connect or mate the connectorized ends of the fibers that are received from the opposite ends of the adapter 104.

The fiber termination device 134 provides features for securing the fiber optic adapter 104 and allowing easy access to the fiber optic adapter 104 when the connectors 106 are inserted into, or removed from, the adapter 104. The fiber optic adapter 104 is configured to connect (e.g. couple or splice) a pair of fiber optic connectors 106 with each other. The fiber optic connectors 106 are used to terminate and provide connectorized fibers. The fiber optic connectors 106 used in the tray can be of various types, such LC, SC, MPO, MTP, MT-RJ, or any other suitable connectors. Accordingly, the fiber optic adapters 104 used in the tray can be configured to receive various types of such connectors. For example, the adapters 104 can be simplex optical adapters, duplex optical adapters, quadruplex adapters, and any other types of optical adapters.

In the illustrated example, two fiber optic adapters 104 are movably retained in the tray 102. The fiber optic adapters 104 can be arranged to be parallel with each other. As illustrated, the tray 102 is configured such that the fiber optic adapters 104 and the fiber optic connectors 106 do not extend beyond the height of the cable containment wall 116.

Referring to FIGS. 1-4, the fiber storage device 130 includes one or more fiber loop management recesses 230. The fiber loop management recess 230 is provided on the peripheral surface 206 of the radius limiter block 200. The fiber loop management recess 230 can extend in a direction along a height of the radius limiter block 200. In some examples, the fiber loop management recess 230 extends along the entire height (or length) of the radius limiter block 200 between the top 208 of the radius limiter block 200 and the bottom of the base plate 114. The fiber loop management recess 230 can be oriented vertically from the bottom of the base plate 114.

The fiber loop management recess 230 includes a groove or cutout that is recessed (or retracted) from the peripheral surface 206 of the radius limiter block 200. The fiber loop management recess 230 is used to at least partially receive a fiber loop management device 300 and arrange the device 300 between the radius limiter block 200 (i.e., the peripheral surface 206 of the radius limiter block 200) and the fibers 136 routed around the radius limiter block 200, as illustrated in FIGS. 5A and 5B.

Figure 5A:
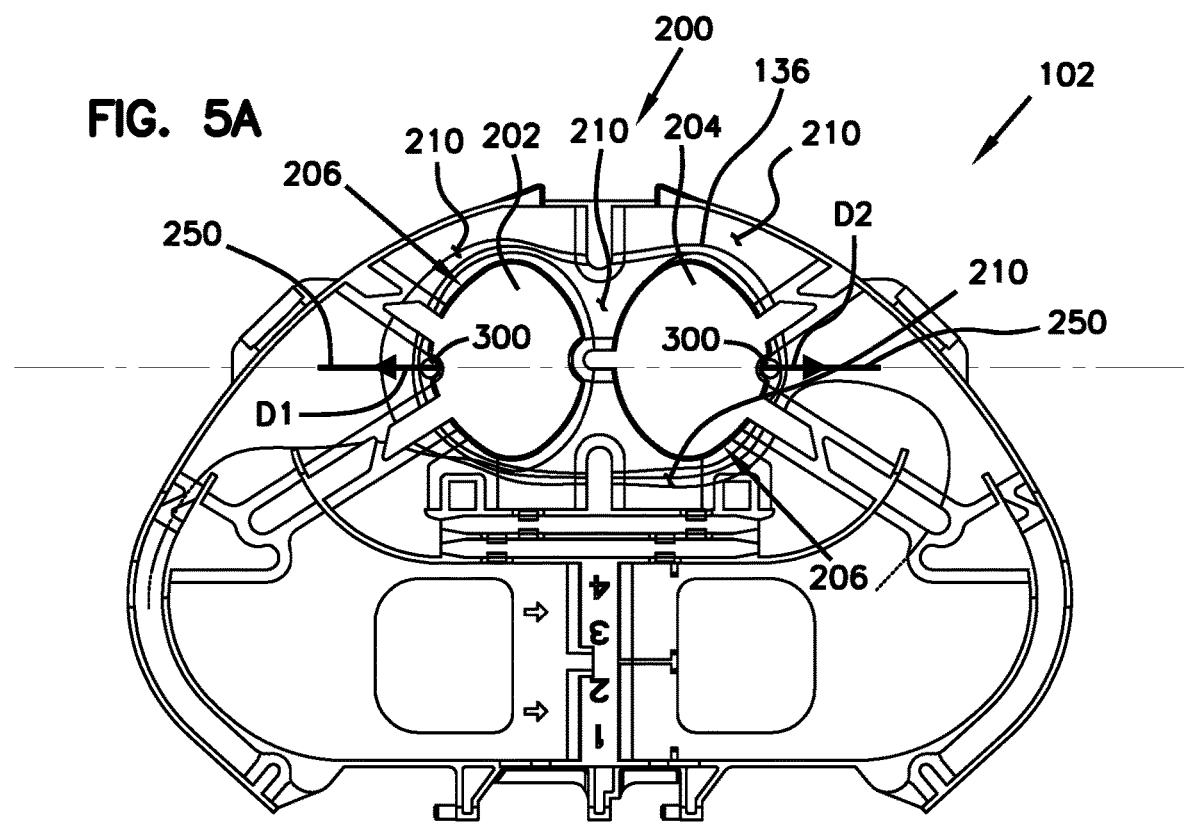
FIG. 5A illustrates that fibers are routed in looped configurations in the telecommunications management apparatus prior to fiber relaxation.
Figure 5B:
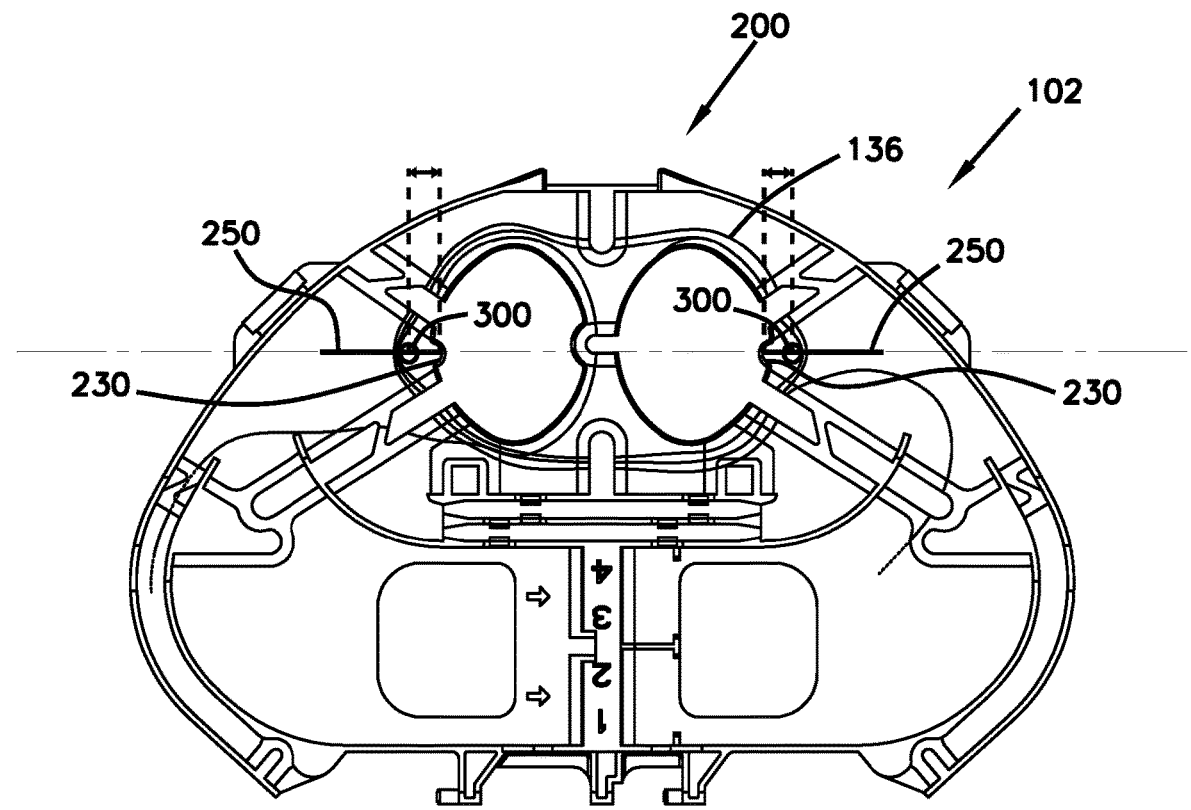
FIG. 5B illustrates that the fibers are routed in looped configurations in the telecommunications management apparatus after fiber relaxation.

As illustrated in FIGS. 1, 5A, and 5B, one or more optical fibers 136 can be routed around the radius limiter blocks 200 in looped configurations. When the optical fibers 136 are wound in a plurality of turns (loops) around the radius limiter blocks 200, not all of the loops of the fibers 136 are routed in an orderly manner. For example, the loops of the fibers 136 around the radius limiter blocks 200 are not consistently formed, as illustrated in FIGS. 1 and 5A. Further, when the fibers 136 are wound in multiple loops around the radius limiter blocks 200, the last loop may need to be loosened to insert the fibers into the fiber loop passage 210 through gaps between pairs of fiber retention tabs 220, thereby retaining the fibers within the fiber loop passage 210 under the fiber retention tabs 220. When the last loop is pulled away from the radius limiter blocks 200 to make some slack, the other loops of the fibers 136 that have previously been routed around the radius limiter blocks 200 are tightened around the radius limiter blocks 200. Such tight wrapping of the fibers 136 around the radius limiter blocks 200 may cause optical losses. For example, when the surrounding temperature becomes lower, the fibers can shrink, and the tightly wrapped fibers may result in signal losses. Therefore, it is desirable to relax the loops of the fibers around the radius limiter blocks 200 so that there is no loop of the fibers that is tightly wrapped around the radius limiter blocks 200 and the loops of the fibers are arranged together in an orderly fashion. However, it is typically difficult to relax the loops of the fibers from the radius limiter blocks 200 because at least some of the loops of the fibers 136 tightly wrap around the radius limiter blocks 200. For example, as illustrated in FIG. 5A, at least some of the loops of the fibers 136 are routed closely around the radius limiter blocks 200 and at least partially abut with the peripheral surface 206 of the radius limiter blocks 200. Therefore, it is difficult for a technician to reach or grab such tightly wrapped loops of the fibers to pull them away from the radius limiter blocks 200.

In some examples, the fiber loop management device 300 can be used to reach behind the tightly-wrapped fibers and pull them away from the radius limiter blocks 200. In some examples, the fiber loop management device 300 can be configured as a stick or an elongated tool, and a technician can engage a tip 302 of the stick behind the fibers 136 (e.g., between the peripheral surface 206 of the radius limiter block 200 and the fibers 136) and move the stick away from the radius limiter block 200 to relax the fibers 136 from the radius limiter block 200. However, it can still be difficult to use the fiber loop management device 300 when the fibers 136 abut with the peripheral surface 206 of the radius limiter block 200 and does not provide a space enough to receive the fiber loop management device 300 between the fibers 136 and the peripheral surface 206 of the radius limiter block 200.

To address this, the fiber loop management recess 230 provides a room that makes it easy to receive the fiber loop management device 300 behind the fibers 136 even when the fibers 136 are tightly wound around the radius limiter block 200, as illustrated in FIG. 5A. When the fiber loop management device 300 is inserted along the fiber loop management recess 230 and disposed between the fibers 136 and the peripheral surface 206 of the radius limiter block 200, the fiber loop management device 300 can be moved radially away from the radius limiter block 200 to space the fibers 136 apart from the peripheral surface 206 of the radius limiter block 200, as illustrated in FIG. 5B.

In some examples, as described herein, the fiber loop management device 300 can be configured as a stick or an elongated tool. Further, the tip 302 of the fiber loop management device 300 can be tapered to have a small or sharp point at the tip 302. Such a sharp tip of the fiber loop management device 300 can help grab particular fibers in looped configurations.

Figure 4:
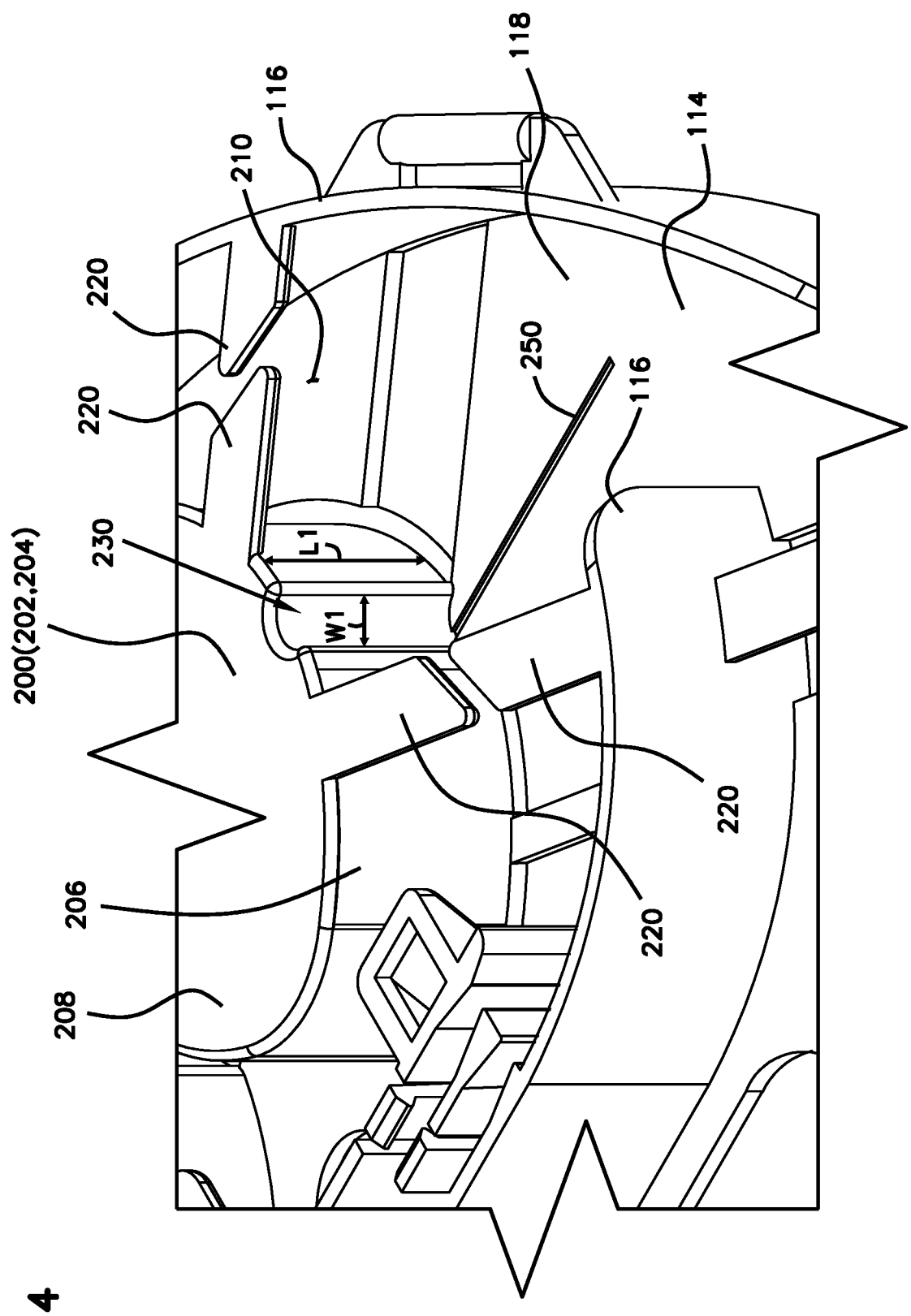
FIG. 4 is an enlarged view of a portion of the telecommunications management apparatus of FIG. 1, illustrating an example fiber loop management recess.

As illustrated in FIGS. 2-4, in some examples, the fiber loop management recess 230 has a consistent width W1 along a length L1 of the recess 230. In the illustrated example, the fiber loop management recess 230 extends along the entire height of the radius limiter block 200 between the top 208 of the radius limiter block 200 and the bottom of the base plate 114 and oriented vertically from the bottom of the base plate 114. Therefore, the length L1 of the fiber loop management recess 230 is identical with the height of the radius limiter block 200, and the width W1 is consistent along the entire height of the radius limiter block 200.

Figure 6:
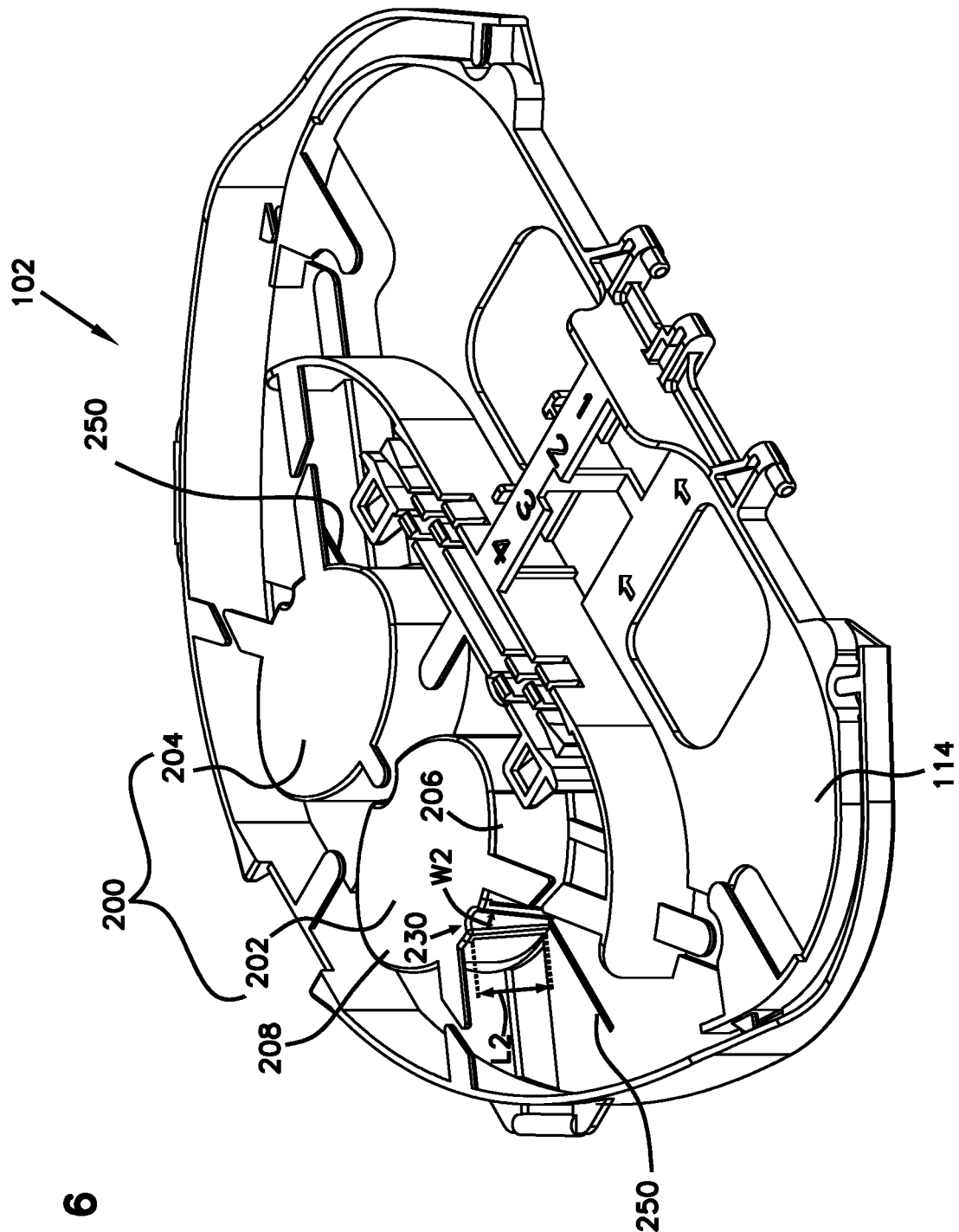
FIG. 6 is a perspective view of a telecommunications management apparatus in accordance with another exemplary embodiment of the present disclosure.

As illustrated in FIG. 6, in other examples, the fiber loop management recess 230 has a width W2 that is tapered along a length L2 of the recess 230. In the illustrated example, the width W2 of the recess 230 becomes narrower from the top 208 of the radius limiter block 200 toward the base plate 114. Similar to FIGS. 2-4, the fiber loop management recess 230 extends along the entire height of the radius limiter block 200 between the top 208 of the radius limiter block 200 and the bottom of the base plate 114 and oriented vertically from the bottom of the base plate 114. Therefore, the length L2 of the fiber loop management recess 230 is identical with the height of the radius limiter block 200, and the width W2 gradually changes along the entire height of the radius limiter block 200. Such a wider width W2 at the top of the radius limiter block 202 can help receive the fiber loop management device 300 easily. In other examples, the width D2 can become wider from the top 208 of the radius limiter block 200 toward the base plate.

Referring to FIGS. 2-6, the fiber storage device 130 further includes one or more guide grooves 250, such as a first guide groove 252 and a second guide groove 254, which are associated with the fiber loop management recesses 230 of the radius limiter blocks 200. The guide grooves 250 are provided on the base plate 114 (i.e., the front side 118 thereof) and configured to guide the fiber loop management device 300 radially from the radius limiter blocks 200. The guide grooves 250 are formed on the base plate 114 and arranged to extend radially from the associated fiber loop management recesses 230 of the radius limiter blocks 200. The guide grooves 250 can be arranged in the fiber loop passage 210.

Each of the guide grooves 250 is configured to engage with a tip of the fiber loop management device 300 when the fiber loop management device 300 is received via the fiber loop management device 300. The guide grooves 250 allows the fiber loop management device 300 to slide thereon, thereby guiding the fiber loop management device 300 to move radially away from the radius limiter block 200 along the guide groove 250.

In the illustrated examples, the first radius limiter block 202 and the second radius limiter block 204 are arranged adjacent to each other (side-by-side). In some examples, the fiber loop management recess 230 (e.g., a first loop management recess) provided in the first radius limiter block 202 is arranged to be opposite to the fiber loop management recess 230 (e.g., a second loop management recess) provided in the second radius limiter block 204. As best illustrated in FIGS. 5A and 5B, the first and second loop management recesses 230 are oriented to face away (arranged in opposite directions or at 90 degrees apart). In some applications, two fiber loop management devices 300 are inserted through the first and second loop management recesses 230, respectively, and are moved in opposite directions D1, D2 together so that the fibers 136 are spaced apart from both the first radius limiter block 202 and the second radius limiter block 204 in such opposite directions D1, D2.

Similarly, the guide groove 250 (e.g., a first guide groove) associated with the fiber loop management recess 230 of the first radius limiter block 202 is arranged to be opposite to the guide groove 250 (e.g., a second guide groove) associated with the fiber loop management recess 230 of the second radius limiter block 204. As best illustrated in FIGS. 5A and 5B, the first and second guide grooves 250 are oriented to extend away from each other (arranged in opposite directions or at 90 degrees apart). In some applications, the tips of the two fiber loop management devices 300 are engaged with the first and second guide grooves 250, respectively, and are guided in the opposite directions D1, D2 so that the fibers 136 are spaced apart from both the first radius limiter block 202 and the second radius limiter block 204 in the opposite directions D1, D2.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A telecommunications management apparatus comprising:
   a base plate;
   a first radius limiter block configured to route fibers therearound and store fibers with minimum bend radius of the fibers ensured, the first radius limiter block projecting from the base plate and having a peripheral surface that extends from the base plate and provides a surface around which the fibers are routed;
   a fiber loop passage provided around the first radius limiter block and configured to receive the fibers routed around the first radius limiter block;
   a first fiber loop management recess provided on the peripheral surface and configured to at least partially receive a first fiber loop management device between the first radius limiter block and the fibers routed around the first radius limiter block; and
   a first guide groove provided on the base plate and configured to guide the first fiber loop management device radially from the first radius limiter block.

2. The telecommunications management apparatus of claim 1, wherein the first guide groove is arranged to extend radially from the first fiber loop management recess of the first radius limiter block.

3. The telecommunications management apparatus of claim 1, wherein the first guide groove is arranged in the fiber loop passage.

4. The telecommunications management apparatus of claim 1, wherein the first fiber loop management recess extends from a top of the first radius limiter block to the base plate.

5. The telecommunications management apparatus of claim 1, wherein the first fiber loop management recess has a consistent width along a length thereof.

6. The telecommunications management apparatus of claim 1, wherein the first fiber loop management recess has a width tapered along a length thereof.

7. The telecommunications management apparatus of claim 6, wherein the width of the first fiber loop management recess becomes narrower from a top of the first radius limiter block toward the base plate.

8. The telecommunications management apparatus of claim 1, further comprising:
a second radius limiter block arranged adjacent to the first radius limiter block, wherein the fiber loop passage includes a figure-8 shaped fiber loop passage around the first radius limiter block and the second radius limiter block.

9. The telecommunications management apparatus of claim 8, further comprising:
a second fiber loop management recess provided on a second peripheral surface of the second radius limiter block and configured to at least partially receive the first fiber loop management device between the second radius limiter block and the fibers routed at least partially around the second radius limiter block.

10. The telecommunications management apparatus of claim 9, wherein the first fiber loop management recess of the first radius limiter block and the second fiber loop management recess of the second radius limiter block are arranged in opposite directions.

11. The telecommunications management apparatus of claim 8, further comprising:
a second guide groove provided on the base plate and configured to guide the first fiber loop management device radially from the second radius limiter block.

12. The telecommunications management apparatus of claim 11, wherein the second guide groove is arranged to extend radially from the second fiber loop management recess of the second radius limiter block and extend opposite to the first guide groove associated with the first radius limiter block.

13. The telecommunications management apparatus of claim 1, further comprising the first fiber loop management device.

14. The telecommunications management apparatus of claim 8, further comprising a second fiber loop management device.

15. The telecommunications management apparatus of claim 1, wherein the first fiber loop management device includes an elongated tool.

16. The telecommunications management apparatus of claim 15, wherein the first fiber loop management device includes a tapered tip.

17. A method for managing fibers in a telecommunications management apparatus, the method comprising:
routing a fiber around a radius limiter block on the apparatus;
engaging a fiber loop management device with a fiber loop management recess provided on a peripheral surface of the radius limiter block, thereby arranging the fiber loop management device between the radius limiter block and the fiber routed around the radius limiter block; and
moving the fiber loop management device radially away from the radius limiter block to space the fiber apart from the peripheral surface of the radius limiter block.

18. The method of claim 17, wherein the step of moving the fiber loop management device includes:
engaging a distal tip of the fiber loop management device with a guide groove provided on a bottom of a base plate of the apparatus, the guide groove extending radially from the radius limiter block; and
moving the fiber loop management device along the guide groove radially away from the radius limiter block.

19. A telecommunications management apparatus comprising:
a base plate;
a radius limiter block configured to route fibers therearound and store fibers with minimum bend radius of the fibers ensured, the radius limiter block projecting from the base plate and having a peripheral surface that extends from the base plate and provides a surface around which the fibers are routed;
a fiber loop passage provided around the radius limiter block and configured to receive the fibers routed around the radius limiter block; and
a fiber loop management recess provided on the peripheral surface and configured to at least partially receive a fiber loop management device between the radius limiter block and the fibers routed around the radius limiter block;
wherein the fiber loop management recess has a width tapered along a length thereof; and
wherein the width of the fiber loop management recess becomes narrower from a top of the radius limiter block toward the base plate.

20. The telecommunications management apparatus of claim 19, wherein the fiber loop management recess extends from the top of the radius limiter block to the base plate.

* * * * *